(12) United States Patent
Madison (10) Patent No.: US 9,446,743 B2
(45) Date of Patent: Sep. 20, 2016

(54) TRAILER JACK SUPPORT

(71) Applicant: Kent R. Madison, Echo, OR (US)

(72) Inventor: Kent R. Madison, Echo, OR (US)

( * ) Notice: Subject to any disclaimer, the term of this patent is extended or adjusted under 35 U.S.C. 154(b) by 148 days.

(21) Appl. No.: 14/099,651

(22) Filed: Dec. 6, 2013

(65) Prior Publication Data

US 2015/0115128 A1 Apr. 30, 2015

Related U.S. Application Data (60) Provisional application No. 61/895,362, filed on Oct. 24, 2013.

(51) Int. Cl.
| | |
|---|---|
| *B60S 9/04* | (2006.01) |
| *B60S 9/22* | (2006.01) |
| *F16M 11/04* | (2006.01) |
| *B60D 1/66* | (2006.01) |

(52) U.S. Cl.
CPC . *B60S 9/22* (2013.01); *B60D 1/66* (2013.01); *B60S 9/04* (2013.01); *F16M 11/046* (2013.01)

(58) Field of Classification Search
CPC .............. B60S 9/04; B60S 9/02; B60S 9/22; F16M 11/046; F16M 11/24; F16M 11/26; B60D 1/66
USPC ................... 254/420; 280/763.1, 764.1, 475; 212/301, 302, 305; 248/354.5, 352
See application file for complete search history.

(56) References Cited

U.S. PATENT DOCUMENTS

| | | | |
|---|---|---|---|
| 2,153,722 A | 4/1939 | Loughmiller | |
| 2,219,907 A | 10/1940 | Ross | |
| 3,345,037 A | 10/1967 | Sweetland, Jr. | |
| 3,425,714 A | 2/1969 | Morris | |
| 3,580,543 A | 5/1971 | Hafeli | |
| 3,841,663 A | 10/1974 | Proffit | |
| 3,863,894 A | 2/1975 | Mansi et al. | |
| 4,078,774 A | 3/1978 | Williams | |
| 4,202,528 A | 5/1980 | Foster | |
| 4,316,601 A * | 2/1982 | Osborne | A01D 75/20 |
| | | | 254/424 |
| 4,352,505 A | 10/1982 | Chambers | |
| 4,441,693 A * | 4/1984 | Silver | B66F 13/00 |
| | | | 254/420 |
| 4,623,125 A | 11/1986 | Ebey | |
| 4,871,183 A | 10/1989 | Moss | |
| 5,011,119 A | 4/1991 | Harrington | |
| D327,354 S | 6/1992 | Inman | |

(Continued)

OTHER PUBLICATIONS

Office action dated Apr. 21, 2014, issued by the United States Patent and Trademark Office in corresponding U.S. Appl. No. 13/791,831, filed Mar. 8, 2013.

(Continued)

*Primary Examiner* — Ryan Kwiecinski
(74) *Attorney, Agent, or Firm* — Klarquist Sparkman, LLP (57) ABSTRACT

A trailer jack support comprises a receptacle for receiving a jack post of a trailer jack and a mechanism such as an insert therein for limiting the depth of insertion of the jack post into the receptacle. As a result, the jack post engages the insert with a more limited extension of the jack post. Also, if there is a significant distance between the ground and jack, for example if the trailer happens to be positioned above a depression in the ground, the jack post may not be able to be extended sufficiently to support the jack. By adjusting the elevation of an insert, a trailer jack support in accordance with this disclosure can reduce the extent to which a jack post needs to be extended to accommodate these varying ground conditions.

20 Claims, 7 Drawing Sheets

(56) References Cited

U.S. PATENT DOCUMENTS

| | | | |
|---|---|---|---|
| 5,174,550 A | 12/1992 | Pittman | |
| 5,184,839 A * | 2/1993 | Guedry | B60D 1/247 |
| | | | 280/475 |
| 5,520,360 A | 5/1996 | Wensman | |
| 6,267,357 B1 | 7/2001 | Ebey et al. | |
| 6,302,381 B1 | 10/2001 | Roll | |
| 7,648,154 B2 | 1/2010 | Green | |
| 8,113,479 B1 * | 2/2012 | O'Connell | A62B 3/00 |
| | | | 248/351 |
| 8,167,330 B2 | 5/2012 | MacDougall | |
| 8,783,716 B1 * | 7/2014 | Pequignot | 280/763.1 |
| 9,004,520 B2 | 4/2015 | Madison | |
| 9,022,355 B1 * | 5/2015 | Pigeon | B66F 3/25 |
| | | | 254/1 |
| 2006/0214147 A1 * | 9/2006 | Meissner | B60S 9/08 |
| | | | 254/420 |
| 2009/0236578 A1 * | 9/2009 | Nirenberg | B60D 1/248 |
| | | | 254/420 |
| 2010/0066068 A1 * | 3/2010 | McMahan | B60S 9/08 |
| | | | 280/763.1 |
| 2010/0213427 A1 | 8/2010 | Trowbridge et al. | |
| 2011/0215286 A1 * | 9/2011 | Harper | B23P 11/00 |
| | | | 254/423 |
| 2013/0092890 A1 * | 4/2013 | Alanko | B60S 9/08 |
| | | | 254/420 |
| 2013/0105658 A1 * | 5/2013 | Hisel | B66F 3/25 |
| | | | 248/352 |
| 2014/0252287 A1 * | 9/2014 | Young | B60S 9/04 |
| | | | 254/419 |
| 2015/0158464 A1 | 6/2015 | Alanko | |

OTHER PUBLICATIONS

Seven pictures of a product called JACK SAVER downloaded from the internet which indicates they were published on Jan. 14, 2013.
Office Action dated Oct. 7, 2013, issued in related U.S. Appl. No. 13/791,831, filed Mar. 8, 2013.
U.S. Appl. No. 29/517,128, filed Feb. 10, 2015. Inventor: Kent R. Madison.
U.S. Appl. No. 29/504,458, filed Oct. 6, 2014. Inventor: Kent R. Madison.

* cited by examiner

TRAILER JACK SUPPORT

CROSS REFERENCE TO RELATED APPLICATION

This application claims the benefit of U.S. Provisional Application Ser. No. 61/895,362, entitled TRAILER JACK SUPPORT, filed on Oct. 24, 2013, which is incorporated by reference herein.

BACKGROUND

In a conventional approach, a trailer jack is rotated in one direction or otherwise actuated to raise a post portion of the jack. The jack is rotated in the opposite direction or otherwise actuated to lower a post portion of the jack. Manual actuation using a handle, electric actuation or hydraulic actuation can also be used to raise and lower the post portion. When lowered, the post portion engages the ground or other jack supporting surface with continued lowering of the post pushing against the jack supporting surface to raise the tongue of a trailer. Conversely, operating the jack to raise the post results in lowering the tongue of the trailer, for example onto the ball of a trailer hitch. Once the trailer hitch is engaged, the post is raised to clear the ground. Problems can arise if the jack post is so far from the ground or jack supporting surface that the jack support cannot be extended enough to reach the ground or other support. Also, in the case of manually actuated jacks, it can require extra time and effort to manually rotate a jack through long distances.

Therefore, a need exists for an improved trailer jack support.

SUMMARY

An embodiment of a trailer jack support comprises a receptacle for receiving a jack post. The trailer jack support comprises a mechanism, such as an insert, for limiting the depth of insertion of the jack post into the receptacle. As a result, the jack post engages the depth of insertion limiting mechanism with a more limited extension of the jack post. Also, if there is a significant distance between the ground and jack, for example if the trailer happens to be positioned above a depression in the ground, the jack post may not be able to be extended sufficiently to support the jack. By adjusting the elevation of engagement of a jack post with a depth limiting mechanism, a trailer jack support in accordance with this disclosure can reduce the extent to which a jack post needs to be extended to accommodate these varying ground conditions.

In accordance with an embodiment, an insert with a jack supporting or engaging portion is movable lengthwise within a receptacle, such as a housing, to various positions therein. The insert can be selectively held in place in a position to which it has been moved to thereby adjust the depth to which the jack post can be inserted into the receptacle.

In one specific example, a trailer jack support comprises an elongated tube mounted to a base. An insert is movable lengthwise within the base to various locations along the base. The insert is retained at a desired position to which it has been moved, such as by one or more retainers, and desirably a single retainer that engages the insert and receptacle. In one form, the retainer comprises a pin, such as a bolt, insertable through aligned openings through the receptacle and the insert. The receptacle desirably has a plurality of different alignment positions at which the insertion of a retainer through the receptacle and insert is allowed when the insert is moved to one of the alignment positions.

In accordance with another aspect, a retainer receiving opening through the insert is positioned nearer to one end portion of the insert than the other end portion of the insert. In addition, the insert is removable from the receptacle or housing. The insert can be removed, inverted and returned to the housing. This inversion changes the relative position of the openings through the insert to the base of the receptacle when the insert is in one of the alignment positions. As a result, greater adjustability of the depth of insertion of the trailer jack post is provided, depending on the orientation of the insert within the housing.

As a further aspect, a slot can be provided that extends along at least a portion of the receptacle or housing. In addition, a projection can extend outwardly from an insert and through the slot. The projection can be grasped by a user for use in shifting the insert along the receptacle from one position of alignment to another position of alignment.

In accordance with a still further aspect, plural aligned pairs of alignment holes can be stacked along the length of the receptacle at spaced locations along such length to define alignment positions through the respective pairs of openings and through a passageway through the insert. In addition, plural aligned pairs of openings stacked and spaced apart from one another can be offset from the first stack of such pairs of openings, such as ninety degrees about the longitudinal axis of the receptacle relative to the first stack of aligned openings, to provide additional adjustment positions.

As a further aspect, the base to which the receptacle is coupled, such as being mounted thereto by welding or other connections (e.g., a threaded connection or a short receptacle or housing receiving sleeve mounted to the base), can have first and second major surfaces. The first major surface can comprise a ground or jack supporting surface engaging surface that is positioned to face a ground or other jack supporting surface when the trailer jack support is in use. A second major surface opposite to the first surface can comprise a support surface from which the receptacle extends upwardly when trailer jack support is in use. The base can comprise a plate, which can have upturned ends, with the first and second major surfaces defining a plane and the receptacle or housing having a longitudinal axis that is positioned vertically relative to the plane of the base. The support surface of the base can comprise ground gripping features, such as grooves and projections if desired or, in an alternative form, can be smooth or planar. A wheel support, which can be pivoted to the base, can be positioned to engage the base support surface with the wheel extending generally in a direction opposite to an insert receiving housing.

In accordance with an embodiment, a trailer jack support is disclosed for receiving and engaging a jack post of a jack. The jack support of this embodiment comprises a base; an elongated jack post receiving housing having a length, the housing comprising a proximal end portion mounted to the base, a distal end portion spaced from the base and a wall extending between the proximal and distal end portions; the distal end portion of the housing defining a jack post receiving opening, the jack post receiving housing having an interior jack post receiving region communicating with the jack post receiving opening for receiving a jack post inserted through the jack post receiving opening and into the jack post receiving region; a first set of retainer receiving openings extending through the wall, the respective openings of the first set of retainer receiving openings being in alignment with one another and opposed from one another such that a retainer is insertable through one of the openings of the first set of openings, through the jack post receiving region and through an opening of the first set of openings other than said one of the openings of the first set of openings; a second set of retainer receiving openings extending through the wall, the respective openings of the second set of retainer receiving openings being in alignment with one another and opposed from one another such that a retainer is insertable through one of the openings of the second set of openings, through the jack post receiving region and through an opening of the second set of openings other than said one of the openings of the second set of openings; the first set of openings being spaced apart along the length of the jack post receiving housing from the second set of openings; and an insert positioned at least partially within the jack post receiving chamber and movable along at least a portion of the length of the of the jack post receiving housing, the insert comprising a stop portion positioned within the jack post receiving chamber, the insert defining a retainer receiving passageway extending therethrough, the insert being movable to a first insert position in which the retainer receiving passageway is aligned with the first set of retainer receiving openings and to a second insert position in which the retainer receiving passageway is aligned with the second set of retainer receiving openings; whereby the depth of the interior jack post receiving region from the jack post receiving opening to the insert is adjusted by moving the insert from the first insert position to the second insert position, the stop portion of the insert limiting the depth of insertion of the jack post into the jack receiving opening when the insert is held in place by a retainer.

As another aspect, the trailer jack support can comprise a right cylindrical housing wall comprising an exterior surface and an interior surface that defines the jack post receiving region. The insert can also comprise a right cylindrical insert body having end portions, the insert being slidable within the jack post receiving region between said first and second insert positions. The stop portion can comprise the end portion of the insert body that is adjacent to the jack post receiving opening.

As yet another aspect, the insert can comprise an insert body having a length and first and second insert body ends. The retainer receiving passageway can be nearer to the first insert body end than the second insert body end.

As yet another aspect, the insert can be slidable within the jack post receiving region of the housing and removable from the housing through the jack post receiving opening.

As a still further aspect, the insert can comprise an insert body having a length and first and second insert body ends. The retainer receiving passageway can comprise a first retainer receiving passageway that is nearer to the first insert body end than the second insert body end. The insert can be slidable within the jack post receiving region of the housing and removable from the body through the jack post receiving opening. Wherein, with the insert positioned within the jack post receiving housing with the first insert body end adjacent to the jack post receiving opening and retained by a retainer in the first insert position, the first insert body end comprises the stop portion spaced a first distance from the jack post receiving opening. Also, with the insert positioned within the jack post receiving housing with the second insert body end adjacent to the jack post receiving opening and retained by a retainer in the first insert position, the second insert body end comprises the stop portion spaced a second distance from the jack post receiving opening, the second distance being different than the first distance. Thus, in embodiments with this aspect, the orientation of the insert body varies the depth of insertion of the jack post actuator into the housing at the same insert position.

As a further aspect, the trailer jack support can comprise a wheel pivotally supported by the base and positioned at the opposite side of the base from the housing.

As a still further aspect, the retainer can comprise a pin, such as a bolt.

In accordance with another aspect, the housing can have a longitudinal axis. The first set of retainer receiving openings can comprise a first set first opening at a first rotational position about the longitudinal axis and a first set second opening that is at a second rotational position about the longitudinal axis that is 180 degrees from the first rotational position. In addition, the second set of retainer receiving openings can comprise a second set first opening at the first rotational position about the longitudinal axis and a second set second opening that is at the second rotational position about the longitudinal axis. The housing can further comprise third, fourth and fifth sets of retainer receiving openings. The respective openings of the third set of retainer receiving openings in this example can be in alignment with one another and opposed from one another such that a retainer is insertable through one of the openings of the third set of openings, through the jack post receiving region and through an opening of the third set of openings other than said one of the openings of the third set of openings. The respective openings of the fourth set of retainer receiving openings can be in alignment with one another and opposed from one another such that a retainer is insertable through one of the openings of the fourth set of openings, through the jack post receiving region and through an opening of the fourth set of openings other than said one of the openings of the fourth set of openings. The respective openings of the fifth set of retainer receiving openings can be in alignment with one another and opposed from one another such that a retainer is insertable through one of the openings of the fifth set of openings, through the jack post receiving region and through an opening of the fifth set of openings other than said one of the openings of the fifth set of openings. The first, second, third, fourth and fifth sets of openings are spaced apart from one another along the length of the housing in accordance with this aspect. The third set of retainer receiving openings can comprise a third set first opening at a third rotational position about the longitudinal axis that is at a third rotational position that is 90 degrees from the first rotational position and a third set second opening that is at a fourth rotational position about the longitudinal axis that is 180 degrees from the third rotational position. The fourth set of retainer receiving openings can comprise a fourth set first opening at the third rotational position about the longitudinal axis and a fourth set second opening that is at the fourth rotational position about the longitudinal axis. The fifth set of retainer receiving openings can comprise a fifth set first opening at the third rotational position about the longitudinal axis and a fifth set second opening that is at the fourth rotational position about the longitudinal axis. The first set first opening and second set first opening can be in a spaced apart row at the first rotational position, the first set second opening and second set second opening can be in a spaced apart row at the second rotational position, the third set first opening and the fourth set first opening and the fifth set first opening can be in a spaced apart row at the third rotational position, the third set second opening and the fourth set second opening and the fifth set second opening can be in a spaced apart row at the fourth rotational position. The first, second, third, fourth and fifth sets of retainer receiving openings are each spaced a different distance from the base in accordance with this aspect. The insert is movable to a third insert position in which the retainer receiving passageway is aligned with the third set of retainer receiving openings, to a fourth insert position in which the retainer receiving passageway is aligned with the fourth set of retainer receiving openings, and to a fifth insert position in which the retainer receiving passageway is aligned with the fifth set of retainer receiving openings. The depth of the interior jack post receiving region from the jack post receiving opening to the insert is adjusted by moving the insert from one of the first, second, third, fourth and fifth insert positions to another of the first, second, third, fourth and fifth insert positions. Also, the stop portion of the insert limits the depth of insertion of the jack post through the jack receiving opening and into the housing interior when the insert is held in place by a retainer.

As yet another aspect, the housing can comprise a housing tube of a right cylindrical shape with a circular cross section and that has an inner housing tube diameter. The insert can comprise an insert tube of a right cylindrical shape with a circular cross section that has an outer insert tube diameter that is less than the inner housing tube diameter.

As a still further aspect, the housing can comprise an elongated slot extending along at least a portion of the length of the housing. The insert can comprise a projection positioned to extend outwardly from the insert and through the slot. The insert can be slidable within the housing. In this example, the projection can be grasped and slid along the slot to move the insert between the first and second insert positions.

As a further embodiment, a trailer jack support for receiving and engaging a jack post of a trailer jack is disclosed and comprises: a base having a base support surface for engaging the ground or other surface from which the trailer is to be jacked and a second surface that faces generally away from the first surface; an elongated jack post receiving housing tube having a length, an interior bounded by an interior housing wall surface, a proximal end portion mounted to the base, a distal end portion spaced from the base that defines a jack post receiving opening communicating with the interior of the housing tube, and a housing tube wall extending between the proximal and distal end portions, the housing tube extending outwardly in an upright direction away from the base support surface of the base when the base support surface is positioned to engage the ground or other surface from which the trailer is to be jacked; plural sets of aligned pairs of retainer receiving openings extending through the housing tube wall, the plural sets of retainer openings being spaced different distances from the proximal end of the housing tube, each set of retainer receiving openings being sized and positioned for receiving a retainer inserted therethrough; and an insert positioned at least partially within the interior of the housing tube and movable along at least a portion of the length of the housing tube, the insert comprising a stop portion positioned within the interior of the housing tube, the insert defining a retainer receiving passageway extending therethrough, the insert being movable to a plurality of alignment positions at which the retainer receiving passageway is aligned with a respective set of the aligned pairs of retainer receiving openings such that a retainer is insertable through the retainer receiving passageway and respective set of aligned pairs of retainer receiving openings; whereby the distance from the jack post receiving opening to the stop portion of the insert is adjusted by moving the insert from one alignment position to another alignment position, the stop portion of the insert limiting the depth of insertion of the jack post into the jack receiving opening when the insert is held in place by a retainer.

As a further aspect, at least a plurality of sets of aligned pairs of retainer receiving openings can be offset from one another about the perimeter of the housing tube.

As yet another aspect, the housing can have a longitudinal axis and the sets of aligned pairs of retainer receiving openings can be aligned along respective lines that are perpendicular to the longitudinal axis and that intersect the longitudinal axis. The plurality of sets of aligned pairs of retainer receiving openings can have first openings through the housing wall positioned along a first line parallel to the longitudinal axis and second openings through the housing wall positioned along a second line parallel to the longitudinal axis, the second line being one 180 degrees about the longitudinal axis from the first line. The plurality of sets of aligned pairs of retainer receiving openings can have first openings through the housing wall positioned along a third line parallel to the longitudinal axis and second openings through the housing wall positioned along a fourth line parallel to the longitudinal axis, the third line being one hundred and eighty degrees about the longitudinal axis from the fourth line and ninety degrees about the longitudinal axis from the first line.

As another aspect, the housing tube can be of a right cylindrical shape with a circular cross section and having an inner housing tube diameter. Also, the insert can comprise an insert tube of a right cylindrical shape with a circular cross section having an outer insert tube diameter that is less than the inner housing tube diameter.

This disclosure is directed to all novel and non-obvious aspects of a jack support and related methods as disclosed herein, as well as of components thereof both alone and in all possible combinations and sub-combinations with one another. It should be noted that the jack support can be used with many types of jacks, not just the example mentioned herein with a jack flange shaped for insertion into and engagement with a coupler.

DETAILED DESCRIPTION

Figure 1:
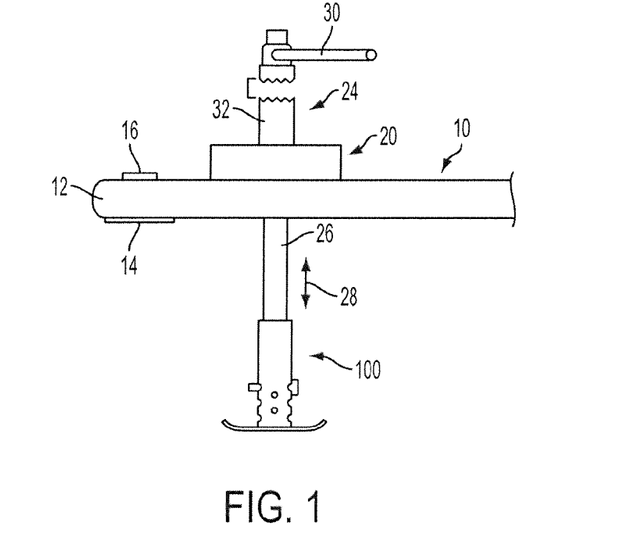
FIG. 1 is a side elevational view of a jack with an exemplary embodiment of a trailer jack support shown in use with a trailer jack for jacking up a trailer.

FIG. 1 illustrates a portion of a trailer 10 having a tongue 12 with a socket 14 for receiving a ball (not shown) of a trailer hitch. A conventional latch 16 can be included for locking the hitch to the ball. Although other forms of jacks can be used with the trailer jack support of this disclosure, in FIG. 1, a jack mounting adaptor 20 is shown coupled to the trailer 10, such as bolted to the trailer tongue structure, for detachably receiving a jack 24. A fixed mounted jack could alternatively be used. The jack 24 comprises a supporting post or stem 26 movable upwardly or downwardly, as indicated by arrow 28, such as by rotation of a handle 30 (or electric or hydraulic actuation) in respective clockwise or counterclockwise directions. The jack post 26 is coupled to a jack housing 32 so as to be axially movable within the jack housing 32, such as in response to rotation of the handle 30. The post 26 can, for example, be threadedly coupled to the housing in a jackscrew configuration in a conventional manner. The jack post is shown inserted into a trailer jack support 100 as described in greater detail below.

Figure 4:
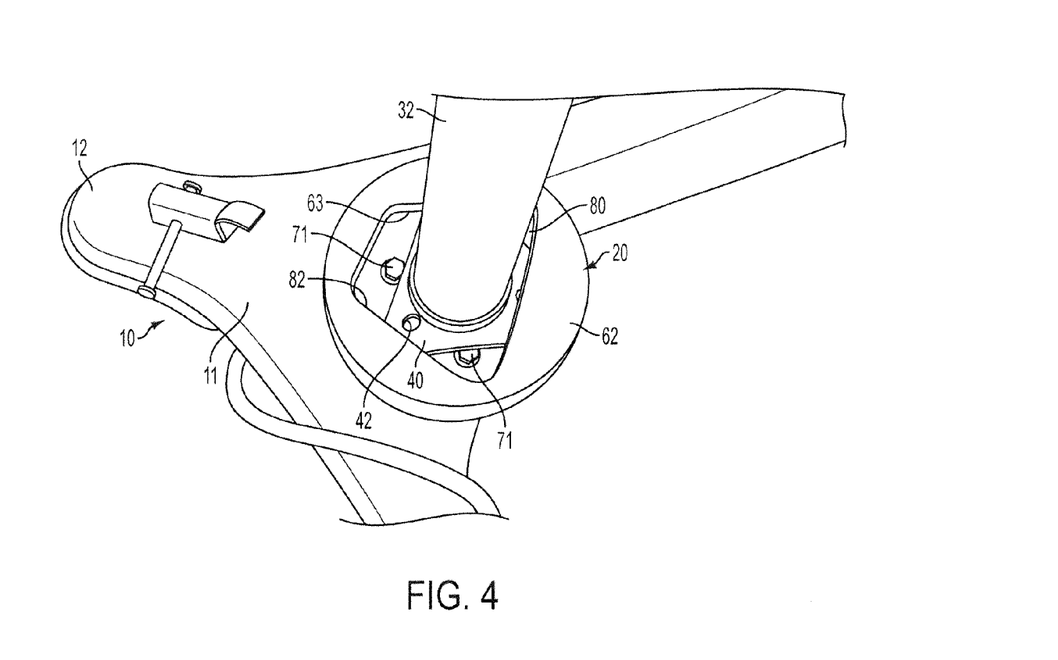
FIG. 4 is a top perspective view of a jack positioned within the mounting adaptor with a jack flange portion of the jack engaging a portion of the mounting adaptor to support the trailer tongue in position as the jack post is raised or lowered.

As can be seen in FIG. 4, the jack can have a mounting flange 40 secured to a lower end of the housing 32. The illustrated mounting flange 40 in FIG. 4 is trapezoidal in shape. When mounted in a conventional manner directly to the trailer tongue structure, the bolt holes of the jack flange (one being indicated at 42 in FIG. 4) are desirably aligned with corresponding holes in a jack support portion of the trailer tongue structure with threaded bolts being inserted through the aligned holes to bolt the flange 40, and thereby the jack, directly to the trailer tongue structure.

In accordance with this example, the flange is desirably not bolted or secured to the trailer as bolts are unnecessary. As an alternative, fasteners, such as non-threaded fasteners, or less desirably threaded bolts, for detachably mounting the jack to the adaptor can be used, but this would be less desirable as a loose fit or loose engagement of these components is more desirable.

Figure 2:
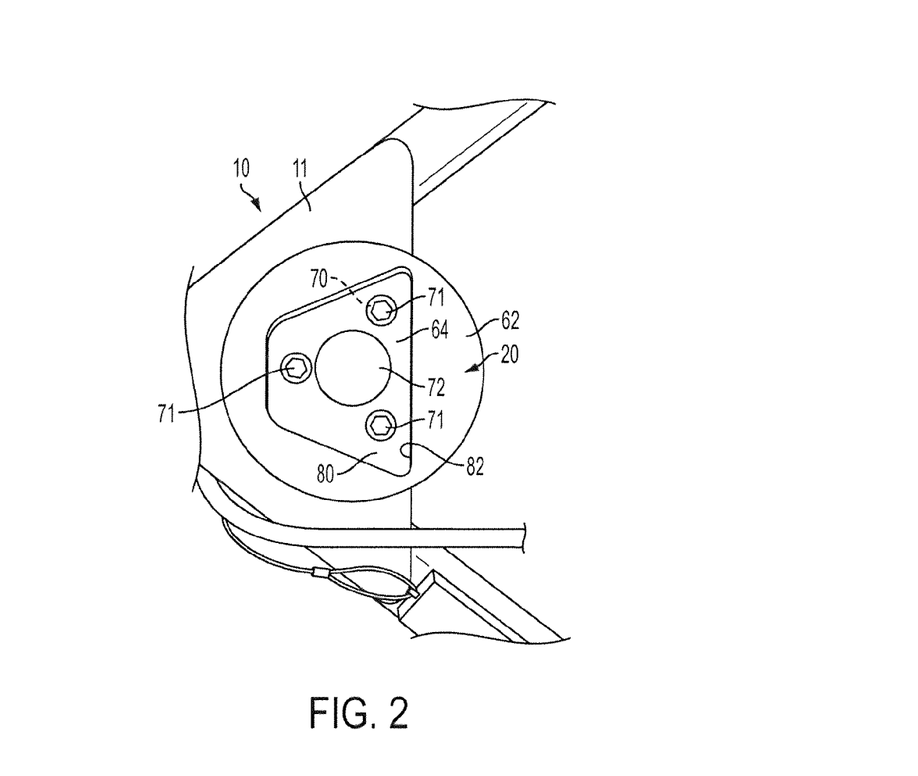
FIG. 2 is a top view of an exemplary mounting adaptor of the jack depicted in FIG. 1.
Figure 3:
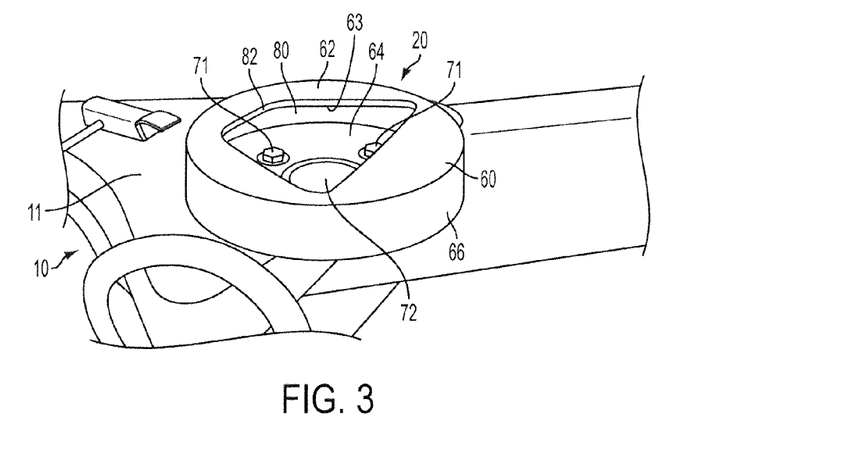
FIG. 3 is a perspective view of the mounting adaptor of FIG. 2.

As can be seen in FIGS. 2 and 3, the illustrated mounting adaptor 20 comprises a housing or body 60 that desirably has a hollow interior with a top portion 62, a bottom portion 64 and a sidewall or body portion 66. The sidewall portion 66 can comprise a cylindrical wall and can be circular in cross-section. As one specific example, the sidewall portion 66 can be a right cylinder, smooth, and made of tubing, such as of a section of six inch outside diameter tubing, such as steel or other durable material (e.g., aluminum). The top and bottom portions 62, 64 can comprise plates, such as of steel or other durable material (aluminum being another example) that can be welded or otherwise secured to the upper and lower end portions of the body 66. The trailer jack support 100 can be made of similar materials, with steel being a desirable example. The lower portion 64 of the body 60 can be provided with plural spaced apart openings, one being numbered as 70 in FIG. 2, for receiving fasteners such as bolts. Desirably, the openings 70 can be in the same pattern as openings in a conventional jack flange 40 provided with a trailer. This facilitates installation of the adaptor 20 as one simply needs to unbolt the jack from the trailer and bolt the adaptor 20 in place of the jack. In FIG. 2, the exemplary fastening bolts are numbered as 71.

An opening 72 is provided through the lower plate or bottom portion 64 of the adaptor 20 through which the jack post 26 can extend. This lower portion 64 can be a second wall or bottom end wall portion of the adaptor. Although not required, desirably opening 72 is sized to be only slightly larger than the post 26 such that the opening assists in guiding the post as it is raised and lowered. Although variable, in the illustrated example, opening 72 is circular in cross-section and, for example, can be about two inches in diameter. The top portion 62 comprises an opening 80 provided therethrough. The top portion 62 can be deemed to be a first wall or top end wall portion of the adaptor. The opening 80 is bounded by a periphery 82. The opening is sized and shaped to permit the insertion of the jack flange 40 downwardly through the opening with the post 26 extending downwardly through the opening 72 in the lower portion 64. The opening 80 is also shaped such that rotation of the jack relative to the trailer mounted adaptor 20 (for example, through 90 degrees, 180 degrees or other rotational amount), shifts the upper surface of the jack flange 40 to a position to engage the undersurface 63 of the top portion 62, such as the undersurface of a plate in the case of a top portion in the form of a plate. In this case, extension or lowering of the jack post 26 relative to jack housing 32 results in the application of force from the upper surface of the jack flange to the engaged portions of adaptor top portion 62, resulting in raising of the trailer as the jack post 26 is extended in a downward direction. Conversely, raising of the jack post 26 sufficiently while the trailer structure is supported, such as by a trailer hitch or other support, results in the upper surface of the jack plate 40 disengaging from the undersurfaces 63 of the portion 62, thereby permitting rotation of the jack to a position where the jack flange and jack can be removed upwardly through opening 80 from the adaptor 20.

In the specific example shown in FIGS. 2-4, the opening 80 defined by the periphery 82, is trapezoidal in shape. The opening can have other configurations while still facilitating entry of a jack flange, with or without a jack flange extension that can be rotated to engage the adaptor for use in jacking up the trailer. In addition, the jack flange 40 in one example is also trapezoidal in shape and can be slightly smaller than the opening 80. When the jack is in one orientation with the flange 40 aligned with the opening 80, the jack flange can readily drop into the interior of the adaptor 20. Rotation of the jack 180 degrees from the jack flange being aligned with the opening to the position shown in FIG. 4, positions a top portion and corner portions of the jack flange underneath corresponding engaging portions of the undersurface 63 of overlying adaptor top portion 62. The jack flange can also be of other shapes.

With the construction shown, the jack flange can be inserted through opening 80 and rotated to a position where it can engage the top portion 62. The post 26 can then be extended by rotating the jack handle 30 to thereby raise the trailer. Conversely, the jack can easily be disengaged from the trailer by reversing the direction of rotation of the handle 30 to raise the post 26 and lower the tongue of the trailer onto a trailer hitch or other support. Continued raising of the post 26 frees the jack flange 40 from the undersurface of portion 62 of adaptor 20, thereby permitting rotation of the jack to again align the jack flange with the opening 80 such that the jack flange and jack can be removed from the trailer for storage until the next use. With this construction, because the jack flange is removed from the trailer, it will not project downwardly where it can be bent if the trailer is driven with the jack post 26 in a downwardly extended position.

Other interfitting engagement mechanisms of the jack flange to a mounting adaptor can be used. Alternatively, the jack can be fixed to the trailer.

Note: The above description is of one example of a trailer jack and coupler from U.S. patent application Ser. No. 13/791,831, which is incorporated herein by reference in its entirety. The incorporated patent application discloses additional examples of jack configurations. Again, the trailer jack support can be used with other forms of jacks, including jacks that are mounted to a trailer structure, such as by bolts or otherwise.

With reference to FIGS. 5-8, an embodiment of a trailer jack support in accordance with the present disclosure is shown. The trailer jack support of this embodiment is generally designated by the number 100. The illustrated jack support 100 comprises a base 110. The base 110 shown in FIG. 5 comprises a major upper surface 112 (the term upper referring to the orientation of the trailer jack support shown in FIG. 5). In addition, the base comprises a lower major surface 114. In the illustrated embodiment, the base is generally rectangular in shape with respective upturned end portions 116, 118. The major surface 114 comprises a ground engaging or support engaging surface of the base. The support surface 114 faces the ground or other support surface such as an upper surface of a block or the like, when the trailer jack support 100 is in use. Although not shown in FIG. 5, the surface 114 can be planar. Alternatively, the surface 114 can be provided with gripping components such as a plurality of spaced apart ridges or other projections for engaging the ground or other support surface. In one desirable form, the support surface 114 is flat.

Figures 5, 6:
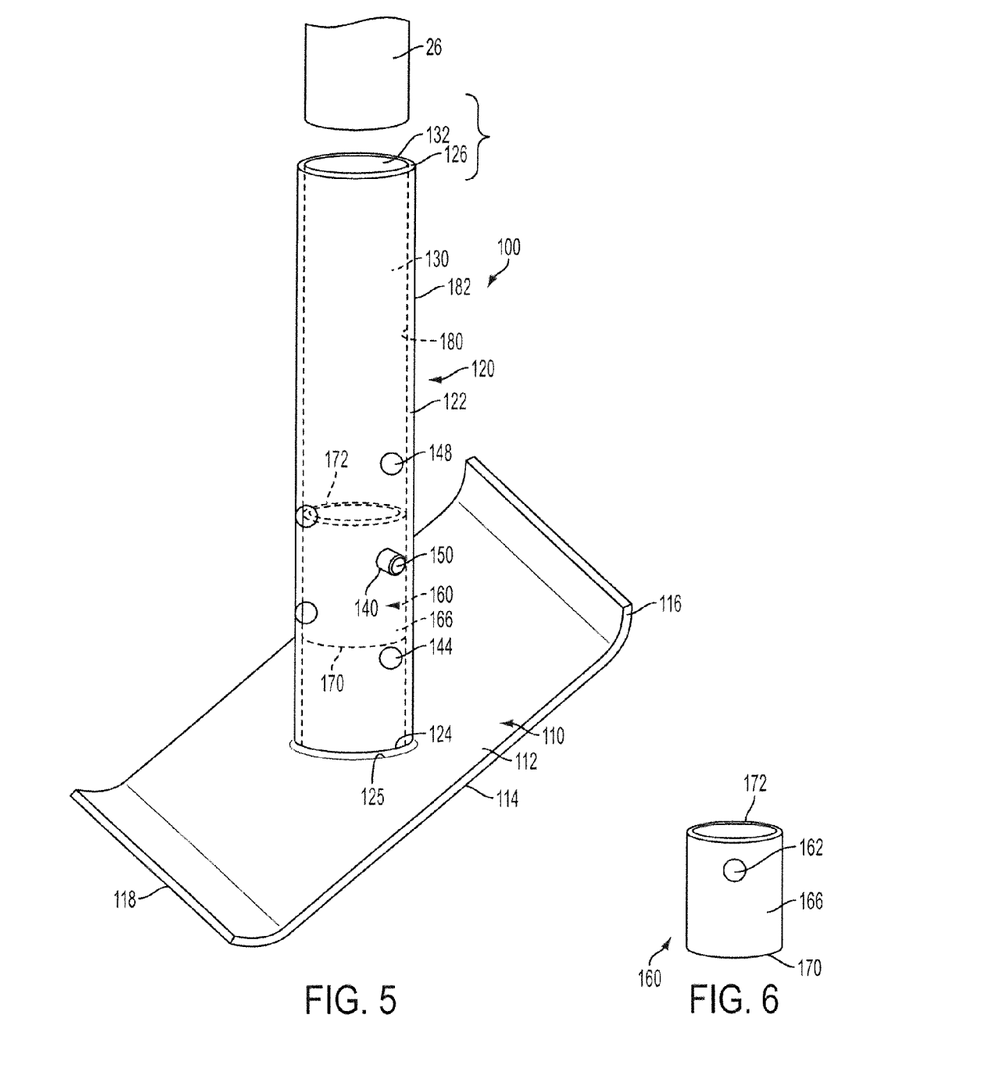
FIG. 5 is a perspective view of an exemplary embodiment of a trailer jack support for use with a trailer jack.
FIG. 6 is a perspective view of one form of insert usable with the trailer jack support of FIG. 5.

The illustrated trailer jack support 100 comprises an elongated jack post receiving receptacle such as a housing 120 that has a length as shown in FIG. 5. The housing can be in the form of a cylinder, such as a right cylinder with a circular cross-section. The housing 120 comprises a wall 122 having a proximal end portion 124 and a distal end portion 126. The proximal end portion 124 is directly or indirectly coupled to the base 110, such as to the upper surface 112 of the base. The end portion 124 can be mounted to the base, such as by welding, a threaded connection, or by inserting or threading the proximal end portion 124 into a small sleeve projecting from the base. Other alternative mechanisms for mounting the housing to the base can be used. In FIG. 5, a weld 125 is shown. The housing has an interior jack post receiving region 130 (FIGS. 5 and 8) that communicates with an upwardly facing opening 132 provided in the distal end 126 of the housing. The opening 132 and interior jack post receiving region are sized such that a jack post 26 can be inserted downwardly through opening 132 and into the interior 130 of the housing.

Figure 8:
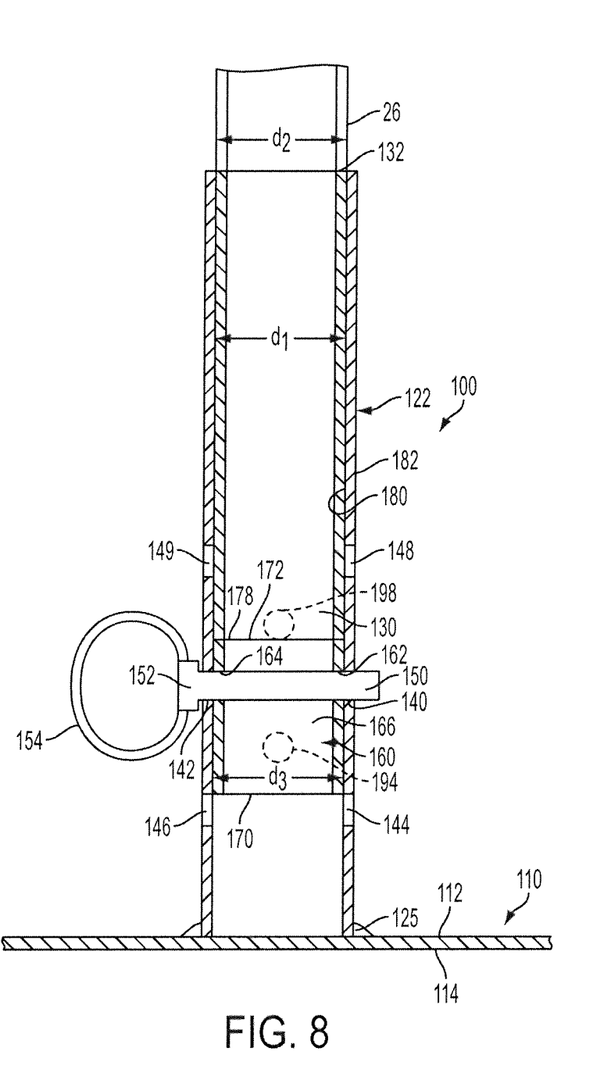
FIG. 8 is a vertical sectional view of the trailer jack support of FIG. 5 showing a jack post inserted into the trailer jack support together with one form of retainer for retaining an insert in position within the trailer jack support.

As can be seen in FIG. 8, in this embodiment the exterior cross-sectional dimension, such as diameter $d_2$, of the jack post 26 is sized to be slightly less than the interior cross-sectional dimension, such as diameter $d_1$ in the case of a circular housing, such that the jack post 26 can be inserted downwardly, in this example, through the opening 132 and into the interior 130 of the housing wall 122. In effect, the jack post is telescopically received by the housing in this example. The opening 132 and interior region 130 can be configured to have a square or otherwise shaped cross-section so as to receive a jack post housing of a correspondingly shaped cross-section. Although desirable, the cross-sectional shape of the jack post and of the opening 132 and interior 130 need not be the same. By maintaining the dimensions $d_1$ and $d_2$ close to one another, stable support is provided for the jack by the wall 122 when the jack post is inserted into the housing.

Figure 7:
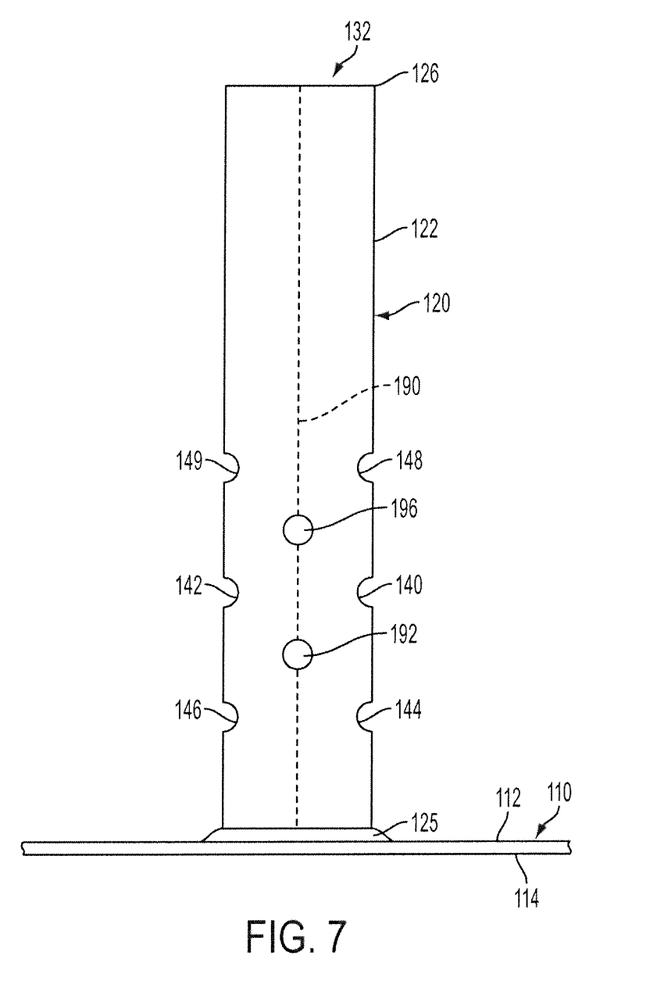
FIG. 7 is a side elevational view of the trailer jack support of FIG. 5.

With reference to FIGS. 5, 7 and 8, a first set of retainer receiving openings 140, 142 are provided through the housing wall 122. The openings 140, 142 are desirably in alignment with one another and are opposed from one another such that a retainer is insertable through one of the openings (e.g., through opening 140) of the first set of openings, and through the other opening (e.g., through opening 142) of the first set of openings. In FIG. 8, a retainer is indicated at 150 and can comprise an elongated retainer, such as a pin or bolt. The retainer 150 is shown inserted through the openings 140, 142 and also through the interior 130 of the trailer jack support 100. The illustrated retainer 150 comprises an enlarged head portion 152 with a pull ring 154 pivotally or otherwise attached thereto. The pull ring 154 can be grasped and used to retract or pull the retainer outwardly from the openings 140, 142.

In addition, the trailer jack support 100 in this embodiment comprises at least one second set of retainer receiving openings like the first set of retainer receiving openings but spaced at different location from the base than the first set of openings. In the example of FIGS. 5, 7 and 8, there are at least two additional sets of retainer receiving openings that are aligned with one another and opposed from one another and that are spaced from the base 100 a different distance than the spacing of openings 140, 142 from the base. These additional sets of openings can be stacked, in this example, respectively above and below the openings 140, 142. More specifically, in this embodiment a second set of aligned retainer receiving openings 144, 146 are shown positioned below the first set of openings 140, 142. In addition, another or third set of aligned openings 148, 149 are shown positioned above the respective first set of openings 140, 142. The first, second and third sets of openings can be offset from one another rather than being stacked above and below one another. Also, although the spacings can be varied, in one specific example, the respective centers of the first set of openings 140, 142 are four inches from base surface 112, the respective centers of the second set of openings are two inches from base surface 112 and the respective centers of the openings 148, 149 of the third set of openings are six inches from base surface 112.

Referring to FIGS. 5, 6 and 8, the illustrated embodiment of a trailer jack support also comprises an insert, one example of which is indicated by the number 160. In one form, the insert can project outwardly beyond the distal end 126 of the housing, for example, by increasing the internal dimension of housing to include an insert while still allowing the jack post to be inserted therein. However, in the illustrated embodiment, insert 160 is shown positioned entirely within the housing 120. With reference to FIG. 8, one specific exemplary form of insert has an external cross-sectional dimension, such as a diameter $d_3$, in the case of a right cylindrical insert, that is less than the cross-sectional dimension of the portion of the interior 130 of the housing 120 within which the insert is positioned. In the case of an insert with a circular cross-section of diameter $d_3$ and a right cylindrical housing with an interior of a diameter $d_1$, $d_3$ is less than $d_1$. As a result, the insert 160 is movable, such as slidable, along the interior of the wall 122 of the housing 120 in a lengthwise direction relative to the housing. The illustrated insert also comprises a retainer receiving passageway extending therethrough. In the case of a solid insert, the passageway can be defined as a channel or passageway extending through the insert. In the case of a hollow insert, the passageway can comprise first and second openings 162, 164 extending through the wall of a body 166 of the insert. Thus, as can be seen in FIG. 8, in the case of a hollow retainer 160, the retainer receiving passageway for receiving retainer 150 extends through respective openings 162, 164 and through the interior of the insert body 166 of the insert 160.

The insert is movable, and desirably slidable, along the length of the housing, to position the retainer receiving passageway extending through the openings 162, 164 in various alignment positions. As an alternative, the insert can be threadedly coupled to the interior surface of the wall of the housing and moved axially along the housing by rotating the insert to the respective alignment positions. In these alignment positions, the passageway through the insert is aligned with a respective set of the sets of retainer receiving openings 148, 149; 144, 146; or 140, 142. In FIG. 8, the passageway through insert 160 is shown in alignment with the first set of openings 140, 142. As is apparent from FIG. 8, when the insert is retained at a fixed position by pin 150 within the housing 100, with openings 162, 164 aligned with the first pair or set of openings 140, 142, the jack post 26 can be inserted a first depth into the housing. If the insert is retained in alignment with a retainer receiving passageway openings 162, 164 in alignment with the second set of openings 144, 146, the depth of penetration of the jack post into the housing is increased to a second depth. If the retainer is positioned such that the passageway openings 162, 164 are aligned with the third set of openings 148, 149, and the insert held in place at this location, the depth of insertion of the jack post into the housing 100 is decreased to a third depth in comparison to the first and second depths of insertion.

Although other forms of stop portions of an insert can be used, in the illustrated embodiment, as best seen in FIG. 8, the insert body 166 has first and second end portions 170, 172. In this example, the end of end portion 172 is positioned to engage the end 178 of the jack post 26 to limit the depth of insertion of the jack post into the housing. The weight of the jack post is distributed over the surface of the end of the insert in this example.

In the example of FIGS. 5, 7 and 8, the trailer jack support wall 122 comprises an interior surface 180 and an exterior surface 182. The interior surface 180 in this example defines a jack post receiving region or chamber 130. Also, the insert body 166 as shown in FIG. 6, in one specific example, comprises a right cylindrical insert body in the form of a tube with a right cylindrical exterior surface. The insert 160 is shown with respective end portions 170, 172. The insert is thus slidable, in this example, between various insert positions. Also, the stop portion of the insert comprises the end portion of the insert body that is adjacent to the jack post receiving opening.

As can be seen in FIG. 6, although the passageway comprising openings 162, 164 through the body 166 of the insert can be the same distance from the ends of the respective end portions 170, 172 of the insert body, in the embodiment shown in FIG. 6 these distances are different. That is, although not required, the passageway defined through openings 162, 164 is desirably offset from the transverse center of the insert, in this example spaced nearer to the end of end portion 172 than the end of end portion 170.

In addition, with the construction shown in FIG. 8, the insert 160 can be removed entirely from the housing 120 through opening 132 and inverted such that end portion 172 is adjacent to base 110 and end portion 170 is spaced further from the base 110. This is in contrast to the orientation shown in FIGS. 5 and 8 wherein the end portion 170 is adjacent to or nearest to the base. Consequently, by removing the insert from the housing, and inverting the insert, further adjustability is achieved. That is, this action will adjust the position of the end of the end portion or stop portion of the insert that engages the jack post when the insert is placed in one of the positions of alignment. For example, in FIG. 5 the insert is shown with the passageway through openings 162, 164 in alignment with the first set of openings 140, 142. With the end of end portion 172 comprising the stop portion of the insert, the depth of insertion of the jack post 26 in this example is the distance from the distal end 126 of the housing 120 to the upwardly facing end of insert end portion 172. In contrast, if the insert is inverted and retained in the same position (with openings 162, 164 aligned with the first set of openings 140, 142), the end of insert end portion 170 would now comprise the stop portion of the insert. Because the retainer receiving passageway through openings 162, 164 of the insert are spaced different distances from the respective ends of the end portions 170, 172, in this example the end of end portion 170 would be nearer to the housing end 126 and farther from the base 110 than was the case with the end of end portion 172 oriented upwardly as shown in FIG. 5. As a result, the depth of penetration of the jack post is reduced when the insert is positioned at this location of alignment and with the end of end portion 170 facing upwardly in comparison to the depth of penetration with the insert 160 in the orientation shown in FIG. 5.

With reference to FIG. 7, it can be seen in this example that the openings 140, 142 of the first set of openings are directly across from one another. Similarly, the openings 144, 146 of the second set of openings are directly across from one another and the openings 148, 149 of the third set of openings are also directly across from one another. That is, in this example, the openings of each set or aligned pair of openings are 180 degrees from one another about the longitudinal axis 190 of the housing 120.

With reference to FIGS. 7 and 8, the illustrated trailer jack support 100 also can comprise a fourth set of openings 192 (FIG. 5) and 194 (FIG. 8) that are aligned with one another. In addition, a fifth set of openings comprising an opening 196 (FIG. 5) and another opening 198 (FIG. 8) are also shown. The illustrated fourth and fifth sets of openings are shown stacked relative to one another in this embodiment with opening 196 positioned above opening 192 and opening 198 positioned above opening 194. In addition, the fourth and fifth sets of openings are spaced apart from one another in a lengthwise direction relative to the housing. Also, the distance from the base surface 112 to the sets of openings 192, 194 and 196, 198 are different than the spacing between the base 112 and the sets of openings 140, 142; 144, 146 and 148, 149. Although the spacing can be varied, in one specific example, the openings 192, 194 are 3 inches from the base surface 112 and the openings 196, 198 are five inches from the base surface 112. In addition, the fourth and fifth sets of openings are offset from the first, second and third sets of openings. More specifically, in the one example illustrated in these figures, the sets of openings comprising openings 192, 194 and 196, 198 are offset by 90 degrees rotationally about the longitudinal axis of the housing relative to the sets of openings 140, 142; 144, 146; and 148, 149. The fourth and fifth sets of openings need not be stacked relative to one another. Also, the first, second, third, fourth and fifth sets of openings can be staggered with each set being positioned at a different rotational position about the longitudinal axis of the housing.

Although other constructions can be used, in FIG. 5 the housing comprises a right cylindrical tube. This is also true of the example in FIG. 8.

Figure 9:
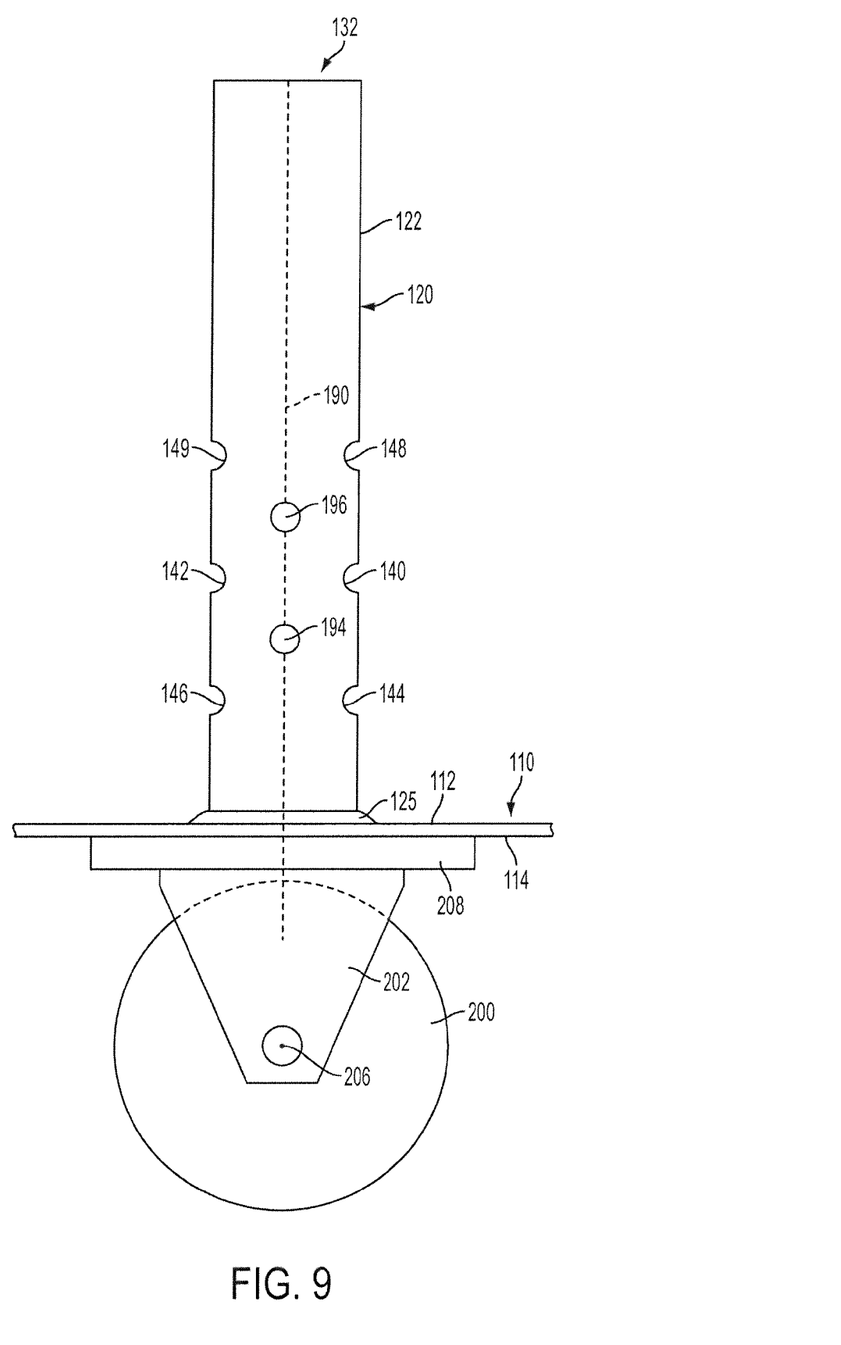
FIG. 9 is an example of an embodiment of a trailer jack support like that of FIG. 5 with a wheel coupled to the base of the trailer jack support.

FIG. 9 illustrates an alternative embodiment of a trailer jack support. For convenience, like elements in FIG. 9 to the elements of the embodiment in FIGS. 5-8 have been assigned like numbers and will not be discussed further. In the embodiment of FIG. 9, a support wheel 200 is pivotally coupled to the trailer jack support for use in wheeling a jacked trailer from one position to another. In the embodiment of FIG. 9, the wheel 200 is supported by a bracket 202 for rotation about an axis 206. The axis 206 is desirably aligned with and perpendicular to the longitudinal axis 190 of the housing 120. The bracket 202 can comprise spaced apart plates, one being positioned along each side of the wheel 200 with the axis being defined by an axle extending through and journaled to the respective bracket plates. The upper end of the bracket 202 is supported by a bearing 208 mounted to, or otherwise coupled to, the base 112. In FIG. 9, the bearing 208 is shown mounted to the undersurface 114 of the base 110. Desirably the bearing 208 supports the wheel for rotation about the axis 190 of the housing 120 with the longitudinal axis of the housing passing through the center of the wheel supporting axle of the assembly.

Figures 10, 11:
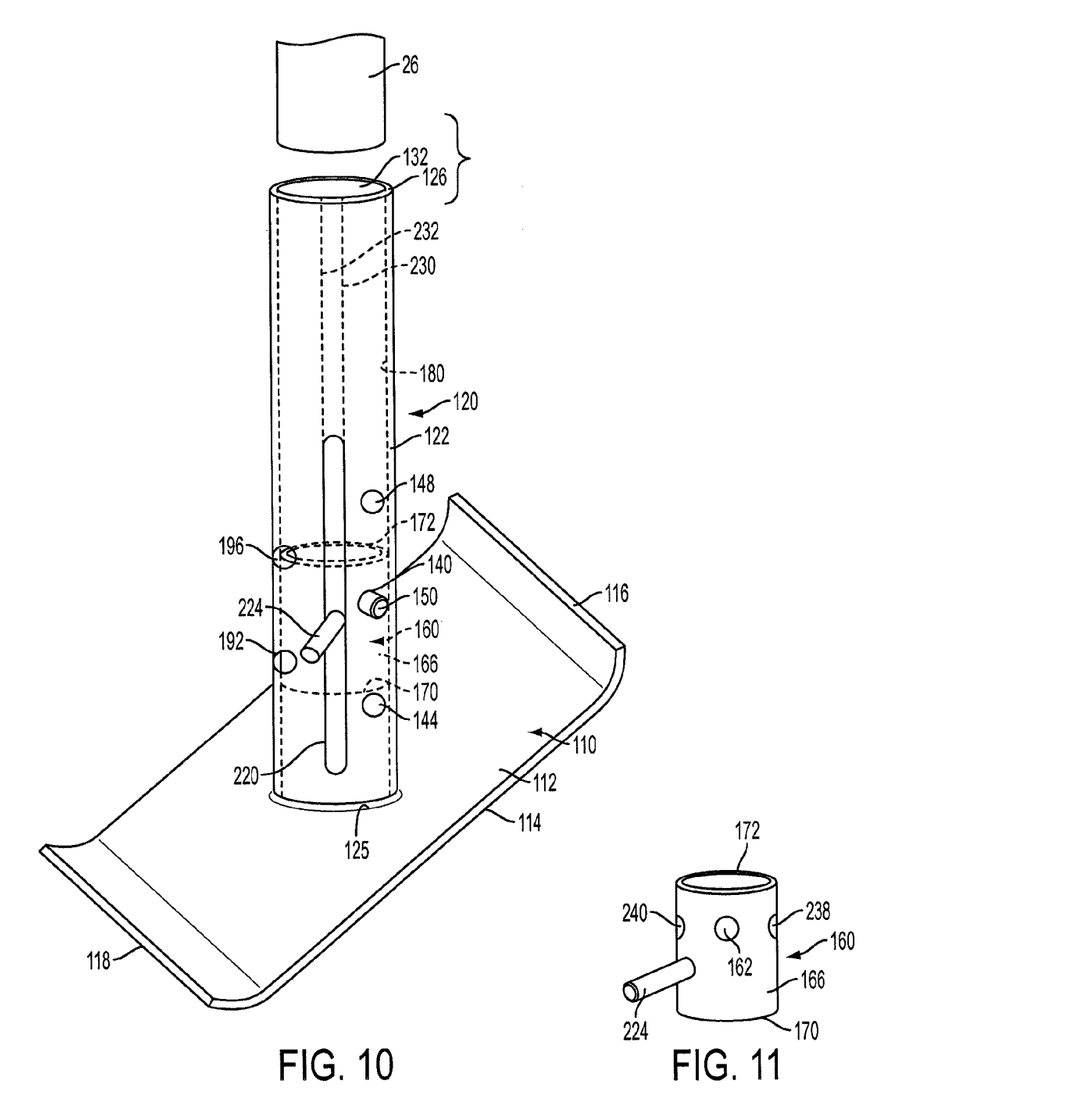
FIG. 10 is an embodiment of a trailer jack support like the embodiment of FIG. 5 with a slot for accommodating an insert position adjustment projection extending from an insert positioned within the trailer jack support.
FIG. 11 is a perspective view of an exemplary insert with a projection that is usable in the embodiment of FIG. 10.

FIGS. 10 and 11 illustrate an alternative construction of a trailer jack support and insert. For convenience, like elements to the elements of the embodiment of FIGS. 5 and 6 are given like numbers and will not be discussed further.

In the embodiment of FIG. 10, a slot 220 is provided in the housing wall 122 and extending, in this example, parallel to the longitudinal axis of the housing. A projection 224 extends outwardly from the insert 160 and through the slot 220. With the retainer 150 removed, the projection 224 can be grasped and used to slide the insert 160 along the wall and housing. The projection 224 can, for example, be threaded or otherwise detachably mounted to the insert body such that the projection can be removed to permit sliding of the insert out of the housing when the retainer 150 is removed. Alternatively, the slot can be extended as indicated by dashed lines 230, 232 to the top or distal end 126 of the housing 122. With this alternative construction, the projection 150 can be fixed to the insert while still permitting removal of the insert from the housing as the projection and insert can be slid to the top to the distal end 126 of the housing 120 and removed therefrom. In this example, another set of openings 238, 240 are provided in alignment with one another and offset, in this example, 90 degrees rotationally from the opening 162. Consequently, the insert can be moved such that the retainer receiving passageway through the openings 238, 240 can be aligned with either of the set of openings 192, 194 and the set of openings 196, 198 and the retainer receiving passageway through openings 162, 164 can be aligned with any of the sets of openings 140, 142; 144, 146; and 148, 149.

Having illustrated and described the principles of my invention with reference to exemplary embodiments, it should be apparent to those of ordinary skill in the art that the embodiments may be modified in arrangement and detail without departing from the principles of this invention. It is to also be understood that all of the features of the disclosed embodiments-need not be included in a trailer jack support to fall within the scope of this invention.

I claim:

1. A trailer jack support for receiving and engaging a jack post of a jack, the trailer jack support comprising:

a base;

an elongated jack post receiving housing having a length, the housing comprising a proximal end portion mounted to the base, a distal end portion spaced from the base and a wall extending between the proximal and distal end portions;

the distal end portion of the housing defining a jack post receiving opening, the jack post receiving housing having an interior jack post receiving region communicating with the jack post receiving opening for receiving a jack post inserted through the jack post receiving opening and into the jack post receiving region;

a first set of retainer receiving openings extending through the wall, the respective openings of the first set of retainer receiving openings being in alignment with one another and opposed from one another such that a retainer is insertable through one of the openings of the first set of openings, through the jack post receiving region and through an opening of the first set of openings other than said one of the openings of the first set of openings; a second set of retainer receiving openings extending through the wall, the respective openings of the second set of retainer receiving openings being in alignment with one another and opposed from one another such that a retainer is insertable through one of the openings of the second set of openings, through the jack post receiving region and through an opening of the second set of openings other than said one of the openings of the second set of openings; the first set of openings being spaced apart along the length of the jack post receiving housing from the second set of openings;

an insert positioned at least partially within the jack post receiving region and movable along at least a portion of the length of the of the jack post receiving housing, the insert comprising a stop portion positioned within the jack post receiving region, the insert defining a retainer receiving passageway extending therethrough, the insert being movable to a first insert position in which the retainer receiving passageway is aligned with the first set of retainer receiving openings and the stop portion is a first distance from the jack post receiving opening, wherein a retainer inserted through the retainer receiving passageway and the first set of retainer receiving openings retains the insert in a the first insert position at a first depth of the interior jack post receiving opening from the stop portion to the jack post receiving opening; the insert being movable to a second insert position in which the retainer receiving passageway is aligned with the second set of retainer receiving openings and the stop portion is a second distance from the jack post receiving opening, wherein a retainer inserted through the retainer receiving passageway and the second set of retainer receiving openings retains the insert in the second insert position at a second depth of the interior jack post receiving opening from the stop portion to the jack post receiving opening; the depth of the interior jack post receiving region from the jack post receiving opening to the stop portion of the insert being adjusted by moving the insert from the first insert position to the second insert position, and wherein the stop portion of the insert limits the depth of insertion of the jack post into the jack receiving opening when the insert is held in place by a retainer; and wherein the insert comprises an insert body having a length and first and second insert body ends, wherein the retainer receiving passageway is nearer to the first insert body end than the second insert body end.

2. A trailer jack support according to claim 1 wherein the wall comprises a right cylinder comprising an exterior surface and an interior surface that defines the jack post receiving region, and wherein the insert comprises a right cylindrical inset body having end portions, the insert being slidable within the jack post receiving region between said first and second insert positions, and wherein the stop portion comprises the end portion of the insert body that is adjacent to the jack post receiving opening.

3. A trailer jack support according to claim 1 wherein the insert is slidable within the jack post receiving region of the housing and is removable from the housing through the jack post receiving opening.

4. A trailer jack support according to claim 1 wherein the insert comprises an insert body having a length and first and second insert body ends, wherein the retainer receiving passageway comprises a first retainer receiving passageway that is nearer to the first insert body end than the second insert body end, wherein the insert is slidable within the jack post receiving region of the housing and is removable from the body through the jack post receiving opening, wherein with the insert positioned within the jack post receiving housing with the first insert body end adjacent to the jack post receiving opening and retained by a retainer in the first insert position, the first insert body end comprises the stop portion spaced a first distance from the jack post receiving opening, and wherein with the insert positioned within the jack post receiving housing with the second insert body end adjacent to the jack post receiving opening and retained by a retainer in the first insert position, the second insert body end comprises the stop portion spaced a second distance from the jack post receiving opening, the second distance being different than the first distance.

5. A trailer jack support according to claim 1 comprising a wheel pivotally supported by the base and positioned at the opposite side of the base from the housing.

6. A trailer jack support according to claim 1 wherein the retainer comprises a pin.

7. A trailer jack support according to claim 1 wherein the housing has a longitudinal axis, the first set of retainer receiving openings comprising a first set first opening at a first rotational position about the longitudinal axis and a first set second opening that is at a second rotational position about the longitudinal axis that is 180 degrees from the first rotational position; the second set of retainer receiving openings comprising a second set first opening at the first rotational position about the longitudinal axis and a second set second opening that is at the second rotational position about the longitudinal axis; the housing further comprising third, fourth and fifth sets of retainer receiving openings; the respective openings of the third set of retainer receiving openings being in alignment with one another and opposed from one another such that a retainer is insertable through one of the openings of the third set of openings, through the jack post receiving region and through an opening of the third set of openings other than said one of the openings of the third set of openings; the respective openings of the fourth set of retainer receiving openings being in alignment with one another and opposed from one another such that a retainer is insertable through one of the openings of the fourth set of openings, through the jack post receiving region and through an opening of the fourth set of openings other than said one of the openings of the fourth set of openings; the respective openings of the fifth set of retainer receiving openings being in alignment with one another and opposed from one another such that a retainer is insertable through one of the openings of the fifth set of openings, through the jack post receiving region and through an opening of the fifth set of openings other than said one of the openings of the fifth set of openings; the first, second, third, fourth and fifth sets of openings being spaced apart from one another along the length of the housing; the third set of retainer receiving openings comprising a third set first opening at a third rotational position about the longitudinal axis that is at a third rotational position that is 90 degrees from the first rotational position and a third set second opening that is at a fourth rotational position about the longitudinal axis that is 180 degrees from the third rotational position; the fourth set of retainer receiving openings comprising a fourth set first opening at the third rotational position about the longitudinal axis and a fourth set second opening that is at the fourth rotational position about the longitudinal axis; the fifth set of retainer receiving openings comprising a fifth set first opening at the third rotational position about the longitudinal axis and a fifth set second opening that is at the fourth rotational position about the longitudinal axis; whereby the first set first opening and second set first opening are in a spaced apart row at the first rotational position, the first set second opening and second set second opening are in a spaced apart row at the second rotational position, the third set first opening and the fourth set first opening and the fifth set first opening are in a spaced apart row at the third rotational position, the third set second opening and the fourth set second opening and the fifth set second opening are in a spaced apart row at the fourth rotational position; and wherein the first, second, third, fourth and fifth sets of retainer receiving openings are each spaced a different distance from the base; the insert being movable to a third insert position in which the retainer receiving passageway is aligned with the third set of retainer receiving openings, to a fourth insert position in which the retainer receiving passageway is aligned with the fourth set of retainer receiving openings, and to a fifth insert position in which the retainer receiving passageway is aligned with the fifth set of retainer receiving openings; whereby the depth of the interior jack post receiving region from the jack post receiving opening to the insert is adjusted by moving the insert from one of the first, second, third, fourth and fifth insert positions to another of the first, second, third, fourth and fifth insert positions; and the stop portion of the insert limiting the depth of insertion of the jack post into the jack receiving opening when the insert is held in place by a retainer.

8. A trailer jack support according to claim 7 wherein the housing comprises a housing tube of a right cylindrical shape with a circular cross section and having an inner housing tube diameter, and wherein the insert comprises an insert tube of a right cylindrical shape with a circular cross section having an outer insert tube diameter that is less than the inner housing tube diameter.

9. A trailer jack support according to claim 1 in which the housing comprises an elongated slot extending along at least a portion of the length of the housing, the insert comprising a projection positioned to extend outwardly from the insert and through the slot, the insert being slidable within the housing; whereby the projection can be grasped and slid along the slot to move the insert between the first and second insert positions.

10. A trailer jack support for receiving and engaging a jack post of a trailer jack, the trailer jack support comprising:

a base having a base support surface for engaging the ground or other surface from which the trailer is to be jacked and a second surface that faces generally away from the first surface;

an elongated jack post receiving housing tube having a fixed length, an interior bounded by an interior housing wall surface, a proximal end portion mounted to the base at a fixed position on the base so as to not be movable relative to the base when mounted to the base, a distal end portion spaced from the base that defines a jack post receiving opening communicating with the interior of the housing tube, and a housing tube wall extending between the proximal and distal end portions, the housing tube extending outwardly in an upright direction away from the second surface and from the base support surface of the base when the base support surface is positioned to engage the ground or other surface from which the trailer is to be jacked;

plural sets of aligned pairs of retainer receiving openings extending through the housing tube wall, the plural sets of retainer openings being spaced different distances from the proximal end of the housing tube, each set of retainer receiving openings being sized and positioned for receiving a retainer inserted therethrough;

an insert positioned at least partially within the interior of the housing tube and movable along at least a portion of the length of the housing tube, the insert comprising a stop portion positioned within the interior of the housing tube, the insert defining a retainer receiving passageway extending therethrough, the insert being movable to a plurality of alignment positions at which the retainer receiving passageway is aligned with a respective set of the aligned pairs of retainer receiving openings such that a retainer is insertable through the retainer receiving passageway and respective set of aligned pairs of retainer receiving openings; whereby the distance from the jack post receiving opening to the stop portion of the insert is adjusted by moving the insert from one alignment position to another alignment position, the stop portion of the insert limiting the depth of insertion of the jack post into the jack receiving opening when the insert is held in place by a retainer; and wherein the housing comprises an elongated slot extending along at least a portion of the length of the housing tube, the insert comprising a projection positioned to extend outwardly from the insert and through the slot, the insert being slidable within the housing tube; whereby the projection can be grasped and slid along the slot to move the insert between the alignment positions.

11. A trailer jack support according to claim 10 wherein the housing tube comprises a right cylinder with an interior jack post receiving region, and wherein the insert comprises a right cylindrical insert body having end portions, the insert being slidable relative to the interior wall of the housing within the jack post receiving region between said alignment positions, and wherein the stop portion comprises the end portion of the insert body that is adjacent to the jack post receiving opening.

12. A trailer jack support according to claim 10 wherein the insert is slidable within the jack post receiving region of the housing and is removable from the housing through the jack post receiving opening.

13. A trailer jack support according to claim 10 wherein the insert comprises an insert body having a length and first and second insert body ends, wherein the retainer receiving passageway comprises a first retainer receiving passageway that is nearer to the first insert body end than the second insert body end, wherein the insert is slidable within the jack post receiving region of the housing and is removable from the body through the jack post receiving opening, wherein with the insert positioned within the jack post receiving housing with the first insert body end adjacent to the jack post receiving opening and retained by a retainer in one of the alignment positions, the first insert body end comprises the stop portion spaced a first distance from the jack post receiving opening, and wherein with the insert positioned within the jack post receiving housing with the second insert body end adjacent to the jack post receiving opening and retained by a retainer in said one alignment position, the second insert body end comprises the stop portion spaced a second distance from the jack post receiving opening, the second distance being different than the first distance.

14. A trailer jack support according to claim 10 comprising a wheel pivotally supported by the base and positioned at the opposite side of the base from the housing.

15. A trailer jack support according to claim 10 wherein at least a plurality of sets of aligned pairs of retainer receiving openings being offset from one another about the perimeter of the housing tube.

16. A trailer jack support according to claim 10 wherein the housing has a longitudinal axis and the sets of aligned pairs of retainer receiving openings are aligned along respective lines that are perpendicular to the longitudinal axis and that intersect the longitudinal axis.

17. A trailer jack support according to claim 10 wherein the housing has a longitudinal axis; wherein a plurality of sets of aligned pairs of retainer receiving openings have first openings through the housing wall positioned along a first line parallel to the longitudinal axis and second openings through the housing wall positioned along a second line parallel to the longitudinal axis, the second line being 180 degrees about the longitudinal axis from the first line; and wherein a plurality of sets of aligned pairs of retainer receiving openings have first openings through the housing wall positioned along a third line parallel to the longitudinal axis and second openings through the housing wall positioned along a fourth line parallel to the longitudinal axis, the third line being 180 degrees about the longitudinal axis from the fourth line and ninety degrees about the longitudinal axis from the first line.

18. A trailer jack support according to claim 10 wherein the housing tube is of a right cylindrical shape with a circular cross section and having an inner housing tube diameter, and wherein the insert comprises an insert tube of a right cylindrical shape with a circular cross section having an outer insert tube diameter that is less than the inner housing tube diameter.

19. A trailer jack support for receiving and engaging a jack post of a trailer jack, the trailer jack support comprising:
a base having a base support surface for engaging the ground or other surface from which the trailer is to be jacked and a second surface that faces generally away from the first surface;
an elongated jack post receiving housing tube having a length, an interior bounded by an interior housing wall surface, a proximal end portion mounted to the base at a fixed position on the base so as to not be movable relative to the base when mounted to the base, a distal end portion spaced from the base that defines a jack post receiving opening communicating with the interior of the housing tube, and a housing tube wall extending between the proximal and distal end portions, the housing tube extending outwardly in an upright direction away from the base support surface of the base when the base support surface is positioned to engage the ground or other surface from which the trailer is to be jacked;

plural sets of aligned pairs of retainer receiving openings extending through the housing tube wall, the plural sets of retainer openings being spaced different distances from the proximal end of the housing tube, each set of retainer receiving openings being sized and positioned for receiving a retainer inserted therethrough;

an insert positioned at least partially within the interior of the housing tube and movable along at least a portion of the length of the housing tube, the insert comprising a stop portion positioned within the interior of the housing tube, the insert defining a retainer receiving passageway extending therethrough, the insert being movable to a plurality of alignment positions at which the retainer receiving passageway is aligned with a respective set of the aligned pairs of retainer receiving openings such that a retainer is insertable through the retainer receiving passageway and respective set of aligned pairs of retainer receiving openings; wherein the distance from the jack post receiving opening to the stop portion of the insert is adjusted by moving the insert from one alignment position to another alignment position;

wherein with the insert in said one alignment position the stop portion is a first distance from the jack post receiving opening and a retainer inserted through the retainer receiving passageway and the respective set of aligned pairs of retainer receiving openings in said one alignment position retains the insert in said one alignment position with a first distance between the stop portion and the jack post receiving opening;

wherein with the insert in said another alignment position the stop portion is a second distance from the jack post receiving opening and a retainer inserted through the retainer receiving passageway and the respective set of aligned pairs of retainer receiving openings in said another alignment position retains the insert in the said another alignment position with a second first distance between the stop portion and the jack post receiving opening; and wherein the distance from the jack post receiving opening to the stop portion of the insert is adjusted by moving the insert from said one alignment position to said another alignment position, and wherein the stop portion of the insert limits the distance of insertion of the jack post into the jack receiving opening when the insert is held in place by a retainer;

wherein the housing tube comprises a right cylinder with an interior jack post receiving region, and wherein the insert comprises a right cylindrical insert body having end portions, the insert being slidable relative to the interior wall of the housing within the jack post receiving region between said alignment positions, and wherein the stop portion comprises the end portion of the insert body that is adjacent to the jack post receiving opening;

wherein the insert comprises an insert body having a length and first and second insert body ends, wherein the retainer receiving passageway comprises a first retainer receiving passageway that is nearer to the first insert body end than the second insert body end, wherein the insert is slidable within the jack post receiving region of the housing and is removable from the body through the jack post receiving opening, wherein with the insert positioned within the jack post receiving housing with the first insert body end adjacent to the jack post receiving opening and retained by a retainer in one of the alignment positions, the first insert body end comprises the stop portion spaced a first distance from the jack post receiving opening, and wherein with the insert positioned within the jack post receiving housing with the second insert body end adjacent to the jack post receiving opening and retained by a retainer in said one alignment position, the second insert body end comprises the stop portion spaced a second distance from the jack post receiving opening, the second distance being different than the first distance; and wherein at least a plurality of sets of aligned pairs of retainer receiving openings being offset from one another about the perimeter of the housing tube.

20. A trailer jack support according to claim 19 in which the housing tube comprises an elongated slot extending along at least a portion of the length of the housing tube, the insert comprising a projection positioned to extend outwardly from the insert and through the slot, whereby the projection can be grasped and slid along the slot to move the insert between the alignment positions.

* * * * *

UNITED STATES PATENT AND TRADEMARK OFFICE
CERTIFICATE OF CORRECTION

PATENT NO. : 9,446,743 B2  
APPLICATION NO. : 14/099651  
DATED : September 20, 2016  
INVENTOR(S) : Kent R. Madison Page 1 of 1

It is certified that error appears in the above-identified patent and that said Letters Patent is hereby corrected as shown below:

In the Claims

Claim 1, Column 14, Line 36, "the length of the of the jack post receiving housing, the" should read
-- the length of the jack post receiving housing, the --

Claim 1, Column 14, Line 46, "retainer receiving openings retains the insert in a the" should read
-- retainer receiving openings retains the insert in the --

Claim 2, Column 15, Line 7, "cylindrical inset body having end portions, the insert being" should read
-- cylindrical insert body having end portions, the insert being --

Signed and Sealed this
Thirteenth Day of March, 2018

Andrei Iancu
*Director of the United States Patent and Trademark Office*